US006210517B1

(12) United States Patent
Eadara et al.

(10) Patent No.: US 6,210,517 B1
(45) Date of Patent: Apr. 3, 2001

(54) RADIATION-CURED, NON-BLOCKING HEAT ACTIVATED LABEL ADHESIVE AND COATINGS AND METHOD FOR USING SAME

(75) Inventors: Rajan Eadara, Ann Arbor; Mooil Chung, Troy; David Wen-Lung Chang, Troy; Weichen Chi, Troy, all of MI (US)

(73) Assignee: Diversified Chemical Technologies, Inc., Ferndale, MI (US)

( * ) Notice: Subject to any disclaimer, the term of this patent is extended or adjusted under 35 U.S.C. 154(b) by 0 days.

(21) Appl. No.: 09/290,737

(22) Filed: Apr. 13, 1999

(51) Int. Cl.[7] .............................. C08J 109/00; C08J 4/02; B32B 31/26; B32B 31/28
(52) U.S. Cl. .................................... 156/273.3; 156/272.2; 156/275.3; 156/275.5; 156/275.7; 522/39; 522/44; 522/46; 522/53; 522/109; 522/110; 522/120; 522/121; 525/98; 525/297; 525/304; 525/305
(58) Field of Search ...................................... 522/110, 109, 522/39, 44, 46, 53, 120, 121; 156/272.2, 273.3, 275.3, 275.5, 275.7; 525/98, 297, 304, 305

(56) References Cited

U.S. PATENT DOCUMENTS

| | | | |
|---|---|---|---|
| 4,284,541 | 8/1981 | Takeda et al. | 260/27 R |
| 4,483,951 | 11/1984 | Brenner | 524/82 |
| 4,952,435 | 8/1990 | Okita | 428/64 |
| 5,104,921 | 4/1992 | Erickson et al. | 524/274 |
| 5,128,388 | * 7/1992 | Komori et al. | |
| 5,244,962 | 9/1993 | Plamthottam et al. | 524/525 |
| 5,284,091 | 2/1994 | Kon et al. | 101/378 |
| 5,695,837 | 12/1997 | Everaerts et al. | 428/40.1 |
| 5,747,551 | 5/1998 | Lewandowski et al. | 522/95 |

* cited by examiner

Primary Examiner—Susan W. Berman
(74) Attorney, Agent, or Firm—Gifford, Krass, Groh, Sprinkle, Anderson & Citkowski, P.C.

(57) ABSTRACT

A radiation curable precursor coating composition for the preparation of a non-blocking, heat activatable adhesive includes a curable acrylic material, a curable elastomeric material, and a hydrocarbon tackifier material having a softening temperature ranging from approximately 50° C. to approximately 200° C., wherein when the acrylic material and the elastomeric material are cured, the coating composition is non-blocking at room temperature, but when the coating composition is heated to a temperature above both the softening temperature of the hydrocarbon tackifier and the Tg of the coating composition, the coating composition becomes adhesive.

35 Claims, No Drawings

US 6,210,517 B1

RADIATION-CURED, NON-BLOCKING HEAT ACTIVATED LABEL ADHESIVE AND COATINGS AND METHOD FOR USING SAME

TECHNICAL FIELD

The subject invention relates generally to radiation curable adhesive compositions and, more particularly, to a non-blocking, heat activated adhesive coating compositions and methods for using same.

BACKGROUND OF THE INVENTION

By way of background, radiation curable adhesive compositions are well known in the art as exemplified by U.S. Pat. No. 5,104,921 to Erickson et al.; U.S. Pat. No. 4,483,951 to Brenner; U.S. Pat. No. 5,695,837 to Everaerts et al.; U.S. Pat. No. 5,747,551 to Lewandoski et al.; U.S. Pat. No. 5,284,091 to Kon et al.; U.S. Pat. No. 5,244,962 to Plamthottam et al.; and U.S. Pat. No. 4,952,435 to Okita. These patents disclose adhesive compositions wherein at least a portion of the composition is cured or cross-linked by the application of radiation generally in the form of ultraviolet radiation or electron beam radiation.

The trend in the adhesive coating industry has been to move towards adhesive compositions which are solventless. The Brenner '951 patent exemplifies this movement towards the use of adhesive compositions containing no solvents. The elimination of solvents eliminates air pollution problems, solvent toxicity problems, and can also offer both energy and labor saving since solventless adhesive compositions are capable of curing in much shorter time periods than solvent-based adhesive compositions and can also be cured without the application of external heat which can cause damage to the underlying article or substrate.

The Brenner '951 patent discloses adhesive compositions which are comprised of an elastomer, a chemically compatible ethylenically unsaturated monomer, a tackifier, and an adhesion promotor, and optionally, pigments, fillers, thickeners, and flow control agents, which are converted from the liquid to the solid state by exposure to high energy ionizing radiation such as that from an electron beam. The constituents of the adhesive compositions disclosed in the Brenner '951 patent are common to this class of adhesives, that being, a polymerizable monomer component, an elastomeric component, and a tackifier.

The composition disclosed in the Brenner '951 patent are taught as being primarily useful as an adhesive for the assembly of composite structures or laminates of, for example, a rubber sheet and a metal base. The adhesive composition can be applied to the elements comprising the composite laminate structure and then the laminate can be built up upon the adhesive layers. The laminate is then subjected to an electron beam to cure the adhesive composition. While certain manufacturing or processing schemes may be adequately accomplished using a radiation cured polymer composition such as that disclosed in the Brenner '951 patent wherein the adhesive composition is applied to the components to be adhered together and thereafter the components are irradiated to cure the composition, there exists a need for a radiation cured, heat activated adhesive coating which can be applied to a multiplicity of articles, cured by the application of radiation, the coated articles then stacked or rolled upon each other without adhering to one another, and the coating can later be activated by the application of heat to allow the coated articles to be adhered to a desired substrate.

The prior art is devoid of any teachings or suggestions for an adhesive composition which can be applied or coated onto a multiplicity of articles, the articles then being radiation cured, and then stacked or rolled upon one another without forming a block or adhering to one another at room temperature thus becoming useless for their designated purpose. While the prior art teaches a number of radiation cured adhesive compositions, the prior art does not disclose an adhesive composition which, after being radiation cured, is non-blocking at room temperature and which remains heat activatable to allow a coated, cured article to be affixed to a substrate upon the application of heat thereto.

Accordingly, it would be advantageous and desirable to have a radiation curable coating composition for the preparation of a non-blocking, heat activatable heat adhesive which, following radiation curing, is non-blocking at room temperature but which also remains heat activable and able to subsequently become adhesive.

SUMMARY OF THE INVENTION

In accordance with the present invention, there is provided a radiation curable precursor coating composition for the preparation of a non-blocking heat activable adhesive which comprises a curable acrylic material, a curable elastomeric material, and a hydrocarbon tackifier material having a softening temperature ranging from approximately 50° C. to approximately 200° C. wherein when the acrylic material and the elastomeric material are cured to produce an adhesive coating composition, the adhesive coating composition is non-blocking at room temperature, but when the cured adhesive composition is heated to a temperature above the softening temperature of the hydrocarbon tackifier, the precursor composition becomes adhesive.

Also in accordance with the present invention, there is provided a method for attaching a first article to a second article which comprises providing a radiation curable, adhesive precursor for preparing a non-blocking, heat activable adhesive. The adhesive comprises a curable acrylic material, a curable elastomeric material, and a hydrocarbon tackifier. The method further includes coating the first article with the adhesive precursor, curing the adhesive precursor so as to produce a cured coating of the adhesive on the first article wherein the cured coating is solid and non-blocking at room temperature. The cured coating on the first article can then be contacted with the second article and heated to a temperature above both the Tg of the adhesive coating and the softening temperature of the hydrocarbon tackifier so as to activate the hydrocarbon tackifier whereby the first article is adhesively affixed to the second article.

DETAILED DESCRIPTION OF THE INVENTION

The adhesive composition of the present invention is a radiation curable precursor coating composition for the preparation of a non-blocking heat activable adhesive and comprises a curable acrylic material, a curable elastomeric material, and a hydrocarbon tackifier material having a softening temperature ranging from approximately 50° C. to approximately 200° C. When the acrylic material and the elastomeric material are cured, the hydrocarbon tackifier remains relatively unchanged and the precursor coating composition is non-blocking and essentially "non-tacky" at room temperature, but when the cured precursor composition is heated to a temperature above the softening temperature of the hydrocarbon tackifier, the hydrocarbon tackifier becomes sticky or tacky but does not melt and the precursor composition becomes adhesive. Upon cooling, a tight adhesive bond can be formed.

The resultant adhesive is resistant to common household detergents, humidity, common solvents, stable against freeze/thaw cycling, heat stable, and can be stored at room temperature.

As described herein, the term "room temperature" is defined as an ambient temperature ranging from between approximately 10° C. and 32° C. but is preferably between approximately 17° C. and 27° C. That is, "room temperature" includes the ambient temperature at which a factory or a warehouse may be commonly maintained.

As defined herein, the term "non-blocking" is defined as the inability of cured adhesive to adhere, at room temperature, to itself, or a substrate upon which it is disposed so as to form a block of relatively solid material which is unusable for its intended purpose. That is, after an article which has been coated with the precursor coating composition of the present invention and then radiation cured, several of these coated articles may be stacked or rolled upon one another without the cured coating adhering to another or an adjacent article.

The term "curing" is typically used as a synonym for cross-linking but can also refer to a combination of additional polymerization plus cross-linking.

The term "softening temperature" is defined as the temperature at which the heat activatable adhesive composition begins to soften and/or become tacky as determined by the ASTM Ring and Ball Test (ASTM D36).

The adhesive composition of the present invention can be utilized, in addition to being used as an adhesive, a protective coating for electronic devices, an ink, and a moisture barrier coating.

The curable acrylic material of the coating composition generally comprises a monomer, a resin, or combinations thereof. In general, the acrylic material has an average molecular weight ranging from approximately 70 to approximately 5,000 and comprises approximately 10% to approximately 70%, by weight, of the coating composition. Generally suitable acrylic monomers include isobornyl methacrylate (SR-423A, Sartomer Chemical Co.), isobornyl acrylate (SR-506, Sartomer Chemical Co.), 1,6-hexanediol diacrylate (SR-238, Sartomer Chemical Co.) and combinations or blends thereof. In a preferred embodiment, the acrylic material is preferably a mixture isobornyl acrylate and 1,6-hexanediol diacrylate in a ratio of approximately 4:1. Still other suitable acrylic monomers and/or resins comparable or equivalent to those described above may also be utilized. The curing rate can be adjusted by choosing the acrylates and by varying the ratio of acrylates with the use of combination of acrylates in the composition.

The curable elastomeric material should be reactive with and soluble in the acrylic material/monomer. Various elastomers possess these necessary characteristics. The curable elastomeric material preferably has a molecular weight ranging from approximately 50 to 10,000 and comprises approximately 5% to approximately 50%, by weight, of the coating composition. Representative examples of suitable elastomeric materials include natural rubber, synthetic rubber such as butyl rubber, butadiene based materials, isoprene based materials, isolene based materials, neoprene based materials and mixtures or polymers thereof. Preferred elastomeric materials utilized in the present invention are KALENE 1300 and KALENE 800, a trade secret liquid low molecular weight butyl rubber from Hardman, a division of Harcros Chemical Inc., Belleville, N.J. Other suitable elastomeric materials comparable or equivalent to those described above may also be used. In the past compositions, the elastomeric material cures to some degree but maintains flexibility in the composition. When heated, the elastomeric material may itself provide some tackiness.

The heat activable hydrocarbon tackifier material comprises approximately 10% to approximately 80%, by weight, of the coating composition. In general, the hydrocarbon tackifier material has a softening temperature ranging from approximately 50° C. to approximately 200° C. More preferably, the hydrocarbon tackifier material has a softening temperature ranging from approximately 100° C. to approximately 150° C. A representative hydrocarbon tackifier material must be compatible with the elastomeric material and includes terpene-based resins such as PICCOLYTE A115-BHT, a terpene hydrocarbon resin which is an alpha-pinene polymer manufactured by Hercules Inc., Wilmington, Del. Other suitable hydrocarbon tackifier materials comparable or equivalent to those described above may also be used. The hydrocarbon tackifier material is not significantly cross-linked or cured during the fabrication of the composition. Despite both the cured acrylic material and the cured elastomeric material, the coating composition remains non-blocking/non-tacky at room temperature even though the hydrocarbon tackifier material is present.

Photoinitiators are required for a UV-cured reaction but generally are not required for electron-beam cured reaction. Photoinitiators are the chemicals that absorb UV light energy and produce free radicals which cause a chemical chain reaction for curing. Once a photoinitiator is exposed to UV light of the correct wavelength, it is converted to an unstable free radical. This radical will quickly react with the available acrylic monomers or the curable elastomeric material. Various photoinitiators possess these necessary characteristics. In general, photoinitiators have an average molecular weight ranging from approximately 50 to approximately 800 and comprise approximately 0.1% to approximately 5%, by weight, of the coating composition. Suitable photoinitiators include 2,2-dimethoxy-2-phenyl acetophenone (Irgacure 651, Ciba Specialty Chemicals Corporation, Tarrytown, N.Y.), 2-methyl-1-[4-(methylthio)phenyl]-2-morpholino propan-1-one (Irgacure 907, Ciba Specialty Chemicals Corporation, Tarrytown, N.Y.), benzophenone (Benz, Sartomer Chemical Company), isopropylthioxanthone (Esacure ITX, First Chemical Corporation) and combinations or blends thereof. A preferred photoinitiator utilized in the present invention is Irgacure 907 from Ciba Specialty Chemicals Corporation, Tarrytown, N.Y. Other suitable elastomeric materials comparable or equivalent to those described above may also be used.

Other materials may be added to the coating composition of the present invention and include additives such as anti-blocking agents such as waxes, micronized waxes, silicones, and fluoro-surfactants; de-aerating agents; surface bonding agents; photoinitiators; photosensitizers; pigments; fillers; flow control agents; thickeners; and the like which was well known to those of ordinary skill in the art.

The present invention also discloses a method for attaching a first article to a second article by the steps of providing a radiation curable adhesive precursor for preparing a non-blocking, heat activatable adhesive as described above, coating the first article with the adhesive precursor, curing the adhesive precursor so as to produce a cured coating of the adhesive precursor on the first article, the cured coating being solid (non-flowing) and non-blocking at room temperature, contacting the cured coating on the first article with the second article, and heating the cured adhesive coating to a temperature above both the Tg of the composition and above the softening temperature of the hydrocarbon tackifier so as to activate the hydrocarbon tackifier whereby the first article is adhesively affixed to the second article. The first article can include any substrate capable of being coated with the adhesive precursor composition including a body of sheet stock such as a paper or plastic labeling material. The second article can include any article or substrate which can withstand being heated to a temperature at least near to or above the forementioned temperature conditions. That is, the second article can comprise any material which is capable of withstanding the designated Tg temperature of the adhesive composition and can include for example, polymeric materials such as polypropylene, polyethylene, and the like.

For example, the first article can comprise sheet stock such as a label for a bottle and the second article can comprise a polymeric material, such as a polyethylene bottle. In order to affix the adhesive precursor coated sheet stock or label to the polymeric material of the second article, the adhesive precursor coated sheet stock can be directly placed into a cavity mold and the polymeric material comprising the bottle can be directly injected into the mold thereby heating the adhesive precursor coating to a temperature above the Tg of the composition activating the hydrocarbon tackifier and applying pressure to the sheet stock/ label and/or the polymeric material/bottle whereby the sheet stock/label is adhesively affixed to the polymeric material/ bottle.

The curing of the curable acrylic material and the curable elastomeric material is accomplished by exposing the adhesive precursor to activating energy including photons and electron beams. When ultraviolet irradiation is utilized to cure the adhesive precursor, the adhesive precursor must include an ultraviolet activating agent, such as a photoinitiator, in order to generate the free radicals necessary to cure the composition. The UV curing process is well known in the art and can be carried out by a number of methods as are well known in the art. The energy for photoinitiation is approximately 2–6 Joules/cm$^2$. The energy required can be generated by using 600 watt/inch UV irradiator (Fusion UV Systems, Inc., Gaithersburg, Md.).

In order to meet the application's specific curing requirements, one of the following UV bulbs can be used:

| Bulb | Power Level | Bulb Length | Wavelength |
|---|---|---|---|
| H-bulb | 600 watt/inch | 10 inch | 250 nm |
| D-bulb | 600 watt/inch | 10 inch | 360 nm |
| V-bulb | 600 watt/inch | 10 inch | 420 nm |

A preferred bulb used in the present invention is D-bulb.

The source of activating energy can also comprise electrons. The electrons can be generated utilizing electron beam processor. The use of electron beam irradiation is described in U.S. Pat. No. 4,483,951 to Brenner.

The electron beam (EB) curing process is also well known in the art. In general, a heated element, such as tungsten, contained in a vacuum chamber is exposed to a high electrical field. Electrons are then generated and directed through a foil that is positioned over the coating or adhesive precursor to be cured. The electron beam processor is designed with safety in mind, having shielding to protect the surrounding environment.

The electrons generated are highly energetic. Due to their small size, the electrons can rapidly penetrate into a coating or adhesive precursor. As an electron penetrates deep into the thickness of the coating or adhesive precursor, it collides with an electron which belongs to an atom of the coating or adhesive precursor resin composition and results in generating a free radical. This is why electron beam cure process does not require a photoinitiator in its chemical formulation.

Dosage is defined as the amount of energy deposited to the coating as adhesive material. The ideal dosage for electron beam curing in industry is 3–5 megarads. Other applications, such as laminating and the like, may require higher energies. This required energy can be produced and deposited by using Electrocure EB Processor (Energy Sciences Inc., Wilmington, Mass.). Electrocure EB Processor consists of two major components, in-line processor for curing and off-line electrical cabinet. In-line processor consists of several components such as, entrance, nitrogen blanket, vacuum chamber, tungsten filament, repeller, grid, window, foil, window clamp, shelfshield electron beam collector, and shelfshield wall.

It may also be desirable to cure the adhesive precursor using both UV curing and electron beam curing. In this situation, an activating agent such as a photoinitiator can be added to the adhesive precursor so that UV curing can be carried out and which also allows the use of EB curing of the same adhesive precursor. That is, for example, the adhesive precursor could be partially cured by UV irradiation and then the curing process could be completed with EB irradiation.

The utility of the compositions and methods according to the present invention are shown below in the Example section.

EXAMPLE 1

An exemplary electron beam-cured formulation of a preferred embodiment of the present invention is as follows:

| Material | MC-5232-EB | Description |
|---|---|---|
| SR-423A | 60 | acrylic material |
| Kalene 1300 | 25 | elastomeric material |
| Piccolyte A-115 | 35 | hydrocarbon tackifier |
| Properties | | |
| Color | light amber | |
| Solids | 100% | |
| Specific gravity | 0.96 | |
| Viscosity (Brookfield RVF spindle #4 @ 20 r.p.m.) | | |
| | @25° C. | 8000 cps |
| | @35° C. | 3500 cps |
| | @45° C. | 2000 cps |
| | @55° C. | 800 cps |
| | @65° C. | 500 cps |

The elastomeric material and tackifier were added into a container and a lid was applied thereto. The mixture was heated at 135° C. (274° F.) while mixing for two hours until the elastomeric material and the tackifier dissolved. The heater was turned off and the lid was opened. When the mixture was hot (135° C.), acrylic material was added little by little into the mixture in five minutes, while mixing. When all the acrylic material was added, the temperature of the mixture was about 80° C. (70–90° C.). The batch was mixed for another five minutes to make it homogeneous. The mixture was filtered and cooled to room temperature.

The resulting material had a light amber color, was viscous fluid, and had a characteristic pine odor when wet but had no odor when cured. The material was then applied to a label and cured by electron beam. The label was then applied to a plastic/polymeric bottle utilizing a hot press for thirty seconds at 180° F. (180–220° F.). The label was successfully adhered to the plastic/polymeric bottle.

EXAMPLE 2

A further exemplary electron beam-cured formulation of a preferred embodiment of the present invention is as follows:

| Material | MC-5285-EB | Description |
|---|---|---|
| SR-506 (isobornyl acrylate) | 60 | acrylic material |
| Kalene 1300 | 25 | elastomeric material |
| Piccolyte A-115 | 35 | tackifier |

The composition was prepared as described above. In this composition, isobornyl acrylate (SR-506) was utilized. The composition produced was found to be compatible and produced a homogenous mixture. The composition had excellent EB response and cured well. A coated label adhered to a plastic bottle after being placed in a hot press for thirty seconds at 180° F. (180°–220° F.).

EXAMPLE 3

A further exemplary electron beam-cured formulation of a preferred embodiment of the present invention is as follows:

| Material | MC-5292-EB | Description |
|---|---|---|
| SR-506 (isobornyl acrylate) | 48 | acrylic material |
| SR-238 (1,6-hexanediol diacrylate) | 12 | acrylic material |
| Kalene 1300 | 25 | elastomeric material |
| Piccolyte A-115 | 35 | tackifier |

Acrylic materials, SR-506 and SR-238, were mixed in a separate container. The elastomeric material and tackifier were added into a container and a lid was applied thereto. The mixture was heated at 135° C. (275° F.), while mixing, for two hours until the elastomeric material and tackifier dissolved. The heater was turned off and the lid was opened. When the mixture was still hot (135° C.), the premixed acrylic materials were added little by little to the mixture while mixing, in five minutes. When all the acrylic materials were added the temperature of the final mixture was in between 70°–90° C. The batch was mixed for five minutes to make it homogeneous. The mixture was filtered and cooled to room temperature (20–28° C.). The final mixture was homogeneous and displayed very good adhesion to a plastic bottle after being placed in a hot press for thirty seconds at 180° F. (180–220° F.).

EXAMPLE 4

An exemplary UV-cured formulation of a preferred embodiment of the present invention is as follows:

| Material | MC-5232-UV | Description |
|---|---|---|
| SR-423A | 60 | acrylic material |
| Kalene 1300 | 25 | elastomeric material |
| Piccolyte A-115 | 35 | hydrocarbon tackifier |

-continued

| | | |
|---|---|---|
| Irgacure 907 | 1 | photoinitiator |
| Properties | | |
| Color | light amber | |
| Solids | 100% | |
| Specific gravity | 0.96 | |
| Viscosity (Brookfield RVF spindle #4 @ 20 r.p.m.) | | |
| | @25° C. | 8000 cps |
| | @35° C. | 3500 cps |
| | @45° C. | 2000 cps |
| | @55° C. | 800 cps |
| | @65° C. | 500 cps |

The preparation of the composition is exactly the same as the one described in Example 1 except that a photoinitiator was added after the final batch was cooled down to room temperature and mixed for another ten minutes to make the batch homogeneous. The composition had excellent UV response and cured well. A coated label adhered to plastic bottle after being placed in a hot press for thirty seconds at 180° F. (180–220° F.).

EXAMPLE 5

A further exemplary UV-cured formulation of a preferred embodiment of the present invention is as follows:

| Material | MC-5285-UV | Description |
|---|---|---|
| SR-506 (isobornyl acrylate) | 60 | acrylic material |
| Kalene 1300 | 25 | elastomeric material |
| Piccolyte A-115 | 35 | tackifier |
| Irgacure 907 | 1 | photoinitiator |

The preparation of the composition is the same as the one described in Example 2 except that a photoinitiator was added after the final mixture was cooled down to room temperature and mixed for another ten minutes to make the batch homogeneous. The composition showed very good UV response and cured well. A coated label adhered to plastic bottle after being placed in a hot press for thirty seconds at 180° F. (180–220° F.).

EXAMPLE 6

A further exemplary UV-cured formulation of a preferred embodiment of the present invention is as follows:

| Material | MC-5292-UV | Description |
|---|---|---|
| SR-506 (isobornyl acrylate) | 48 | acrylic material |
| SR-238 (1,6-hexanediol diacrylate) | 12 | acrylic material |
| Kalene 1300 | 25 | elastomeric material |
| Piccolyte A-115 | 35 | tackifier |
| Irgacure 907 | 1 | photoinitiator |

The preparation of the composition is the same as the one described in Example 3 except that a photoinitiator was added after the final mixture was cooled down to room temperature and mixed for another ten minutes to make the batch homogeneous. The composition also showed very good UV response and cured well. A coated label adhered to plastic bottle after being placed in hot press for thirty seconds at 180° F. (180°–220° F.).

EXAMPLE 7

Example 7 illustrates the effects on the electron beam curing of adhesive coatings of the present invention with the variation of electron beam energy level. In this example the adhesive temperature was maintained at 25° C. The adhesive was applied to the back side of the labels and was passed under an electron beam processor at a constant speed which was maintained at 50 feet/minute wherein the electron beam energy level was varied. The number of passes underneath the electron beam processor is shown in Table I and illustrates the effect of electron beam energy level on the curing of the three exemplary adhesive coatings of the present invention.

TABLE I

Electron Beam Cure Study of Adhesives with the Variation of Electron Beam Energy Level

| EB Energy (Megarads) | MC-5232-EB | MC-5285-EB | MC-5292-EB | Cure |
|---|---|---|---|---|
| 3 Megarads | 6 passes | 3 passes | 1 pass | cured |
| 4 Megarads | 5 passes | 2 passes | 1 pass | cured |
| 6 Megarads | 4 passes | 1 pass | 1 pass | cured |
| 12 Megarads | 2 passes | 1 pass | 1 pass | cured |

Adhesive Temperature: 25° C.
Line Speed: 50 ft/minute
Coating Thickness: 0.001 inch (1 mil), wet film thickness

EXAMPLE 8

Example 8 illustrates the effects on the UV curing of adhesive coatings of the present invention with variation of UV intensity. In this example, the adhesive temperature was maintained at 25° C. The adhesive was applied to an article and was passed under a UV emitter at a constant speed which was maintained at 5 feet/minute wherein the intensity of the UV radiation was varied. The number of passes underneath the ultraviolet emitter is shown in Table II and illustrates the effect of UV intensity on the curing of the three exemplary adhesive coatings of the present invention.

TABLE II

UV-Cure Study of Adhesives with the Variation of UV Intensity

| UV Intensity | MC-5232-UV | MC-5285-UV | MC-5292-UV | Cure |
|---|---|---|---|---|
| 45% | 8 passes | 7 passes | 5 passes | cured |
| 60% | 4 passes | 4 passes | 3 passes | cured |
| 75% | 3 passes | 3 passes | 2 passes | cured |
| 90% | 1 pass | 1 pass | 1 pass | cured |

Adhesive Temperature: 25° C.
Conveyor Speed: 5 ft/min
UV Intensity: Varied (45%, 60%, 75% and 90%)
Adhesive Thickness: 0.001 inch (1 mil), wet film thickness
Bulb: 600 watt/inch @ 100% intensity (Dosage; 0.1 to 1.5 Joules/cm$^2$)

EXAMPLE 9

In this example, a UV-curing study of the adhesive coatings of the present invention was undertaken to ascertain the effect of varying the adhesive temperature on the curing of the adhesive coating. The UV intensity was maintained at a constant 75% and the conveyor speed was maintained at 5 feet/minute. The results are shown in Table III.

TABLE III

UV-Cure Study of Adhesives with the Variation of Adhesive Temperature

| Adhesive Temp | MC-5232-UV | MC-5285-UV | MC-5292-UV | Cure |
|---|---|---|---|---|
| 20° C. (68 °F.) | 3 passes | 3 passes | 2 passes | cured |
| 60° C. (140 °F.) | 1 pass | 1 pass | 1 pass | cured |
| 100° C. (212 °F.) | 1 pass | 1 pass | 1 pass | cured |

Adhesive Temperature: varied (20° C., 60° C., 100° C.)
Conveyor Speed: 5 ft/minute
UV Intensity: 75%
Adhesive Thickness: 0.001 inch (1 mil), wet film thickness In view of the teaching presented herein, other modifications and variations of the present inventions will be readily apparent to those of skill in the art. The foregoing discussion and description are illustrative of some embodiments of the present invention, but are not meant to be limitations on the practice thereof. It is the following claims, including all equivalents, which define the scope of the invention.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods, procedures and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed:

1. A radiation curable precursor coating composition for the preparation of a non-blocking, heat activatable adhesive, said precursor composition comprising:

a radiation curable acrylic material selected from the group consisting of isobornyl methacrylate, isobornyl acrylate, 1,6-hexanediol diacrylate, and combinations thereof;

a radiation curable elastomeric material; and a hydrocarbon tackifier material having a softening temperature ranging from approximately 50° C. to approximately 200° C., wherein when said acrylic material and said elastomeric material are cured, said coating composition is non-blocking at room temperature, but when said cured composition is heated to a temperature above both the softening temperature of said hydrocarbon tackifier and the Tg of the cured coating composition, said composition becomes adhesive.

2. A coating according to claim 1, wherein said acrylic material comprises approximately 10% to approximately 70%, by weight, of said coating composition.

3. A coating composition according to claim 1, wherein said acrylic material comprises a mixture of isobornyl acrylate and 1,6-hexanediol diacrylate in a ratio of approximately 4:1.

4. A coating composition according to claim 1, wherein said curable elastomeric material has a molecular weight ranging from approximately 50 to approximately 10,000.

5. A coating composition according to claim 1, wherein said curable elastomeric material comprises approximately 5% to approximately 50%, by weight, of said coating composition.

6. A coating composition according to claim 1, wherein said curable elastomeric material is selected from the group consisting of:
a butyl rubber, a butadiene based material, an isoprene based material, an isolene based material, neoprene based material, and mixtures or polymers thereof.

7. A coating composition according to claim 1, wherein said hydrocarbon tackifier material comprises a terpene-based resin.

8. A coating composition according to claim 7, wherein said terpene-based resin comprises alpha-pinene polymer.

9. A coating composition according to claim 1, wherein said hydrocarbon tackifier comprises approximately 10% to approximately 80%, by weight, of said coating composition.

10. A coating composition according to claim 1 further comprising a photoinitiator.

11. A coating composition according to claim 10, wherein said photoinitiator has a molecular weight ranging from approximately 50 to approximately 800.

12. A coating composition according to claim 10, wherein said photoinitiator comprises approximately 0.1% to approximately 5%, by weight, of said coating composition.

13. A coating composition according to claim 10, wherein said photoinitiator is selected from the group consisting of 2,2-dimethoxy-2-phenyl acetophenone, 2-methyl-1-[4-(methylthio)phenyl]-2-morpholino propan-1-one, benzophenone, isopropylthioxanthone, and combinations or blends thereof.

14. A method for attaching a first article to a second article, said method comprising the following steps in sequence:
(a) providing a radiation curable, adhesive precursor for preparing a non-blocking, heat activatable adhesive comprising a radiation curable acrylic material, a radiation curable elastomeric material, and a hydrocarbon tackifier;
(b) coating the first article with the adhesive precursor;
(c) curing by exposing the adhesive precursor to activating energy so as to produce a cured coating of the adhesive precursor on the first article, the cured coating being solid and non-blocking at room temperature;
(d) contacting the cured coating on the first article with the second article; and
(e) heating the adhesive coating to a temperature above both the Tg of the composition and the softening temperature of the hydrocarbon tackifier so as to activate the hydrocarbon tackifier wherein the first article is adhesively affixed to the second article.

15. A method according to claim 14, wherein one of the first article and the second article comprises a body of sheet stock and the other comprises a body of polymeric material.

16. A method according to claim 15, wherein the first article comprises sheet stock, the second article comprises a polymeric material, wherein said contacting step comprises placing the adhesive precursor coated sheet stock into a cavity mold and injecting the polymeric material thereinto.

17. A method according to claim 14, wherein said curing step comprises exposing the adhesive precursor to activating energy.

18. A method according to claim 17, wherein the activating energy comprises photons.

19. A method according to claim 18, wherein the photons are in the ultra-violet wavelengths.

20. A method according to claim 17, wherein the activating energy comprises electrons.

21. A method according to claim 17, wherein the activating energy comprises ultra-violet light energy and electrons.

22. A method according to claim 14, wherein the acrylic material has an average molecular weight ranging from approximately 70 to approximately 5,000.

23. A method according to claim 14, wherein the acrylic material comprises approximately 10% to approximately 70%, by weight, of the adhesive precursor.

24. A method according to claim 14, wherein the acrylic material is selected from the group consisting essentially of isobornyl methacrylate, isobornyl acrylate, 1,6-hexanediol diacrylate, and combinations thereof.

25. A method according to claim 24, wherein the acrylic material comprises a mixture of isobornyl acrylate and 1,6-hexanediol in a ratio of approximately 4:1.

26. A method according to claim 14, wherein the curable elastomeric material has a molecular weight ranging from approximately 50 to approximately 10,000.

27. A method according to claim 14, wherein the curable elastomeric material comprises approximately 5% to approximately 50%, by weight, of the adhesive precursor.

28. A method according to claim 14, wherein the curable elastomeric material is selected from the group consisting essentially of: a butyl rubber, a butadiene based material, an isoprene based material, an isolene based material, neoprene based material, and mixtures or polymers thereof.

29. A method according to claim 14, wherein the hydrocarbon tackifier material comprises a terpene-based resin.

30. A method according to claim 29, wherein the terpene-based resin comprises alpha-pinene polymer, or beta-pinene polymer.

31. A method according to claim 14, wherein the hydrocarbon tackifier comprises approximately 10% to approximately 80%, by weight, of the adhesive precursor.

32. A method according to claim 14, wherein the adhesive precursor further comprises a photoinitiator.

33. A method according to claim 32 further comprising a photoinitiator having a molecular weight from approximately 50 to approximately 800.

34. A method according to claim 32, wherein the photoinitiator comprises approximately 0.1% to approximately 5% by weight of the adhesive precursor.

35. A method according to claim 32, wherein the photoinitiator is selected from the group consisting of: 2,2-dimethoxy-2-phenyl acetophenone, 2-methyl-1-[4-(methylthio)phenyl]-2-morpholino propan-1-one, benzophenone, isopropylthioxanthone, and combinations or blends thereof.

* * * * *